No. 819,468. PATENTED MAY 1, 1906.
E. T. SULZER.
TOY FISH TANK.
APPLICATION FILED MAY 11, 1905.
2 SHEETS—SHEET 1.
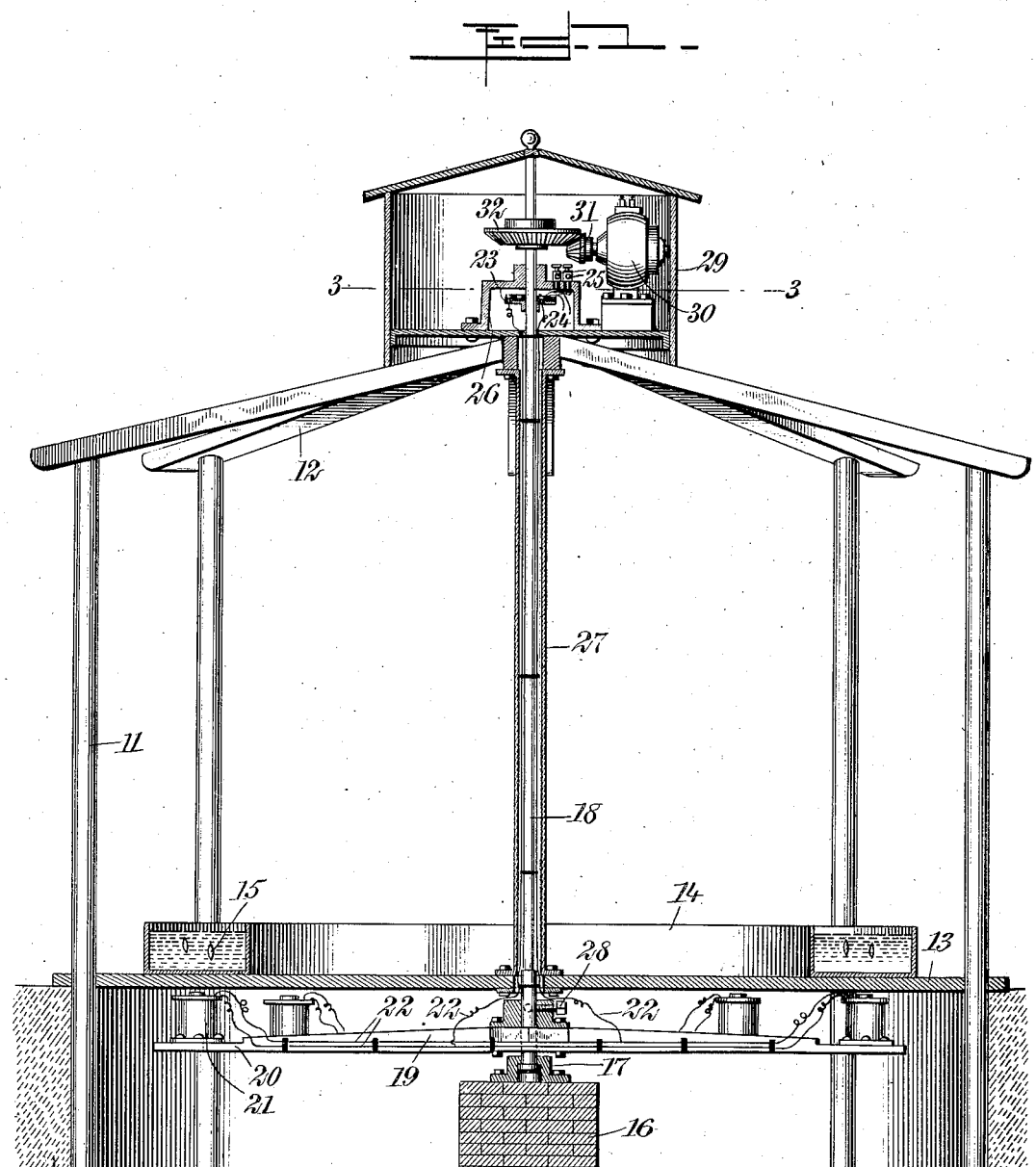
WITNESSES:
INVENTOR
Ernest T. Sulzer
BY
ATTORNEYS No. 819,468. PATENTED MAY 1, 1906.
E. T. SULZER.
TOY FISH TANK.
APPLICATION FILED MAY 11, 1905.
2 SHEETS—SHEET 2.
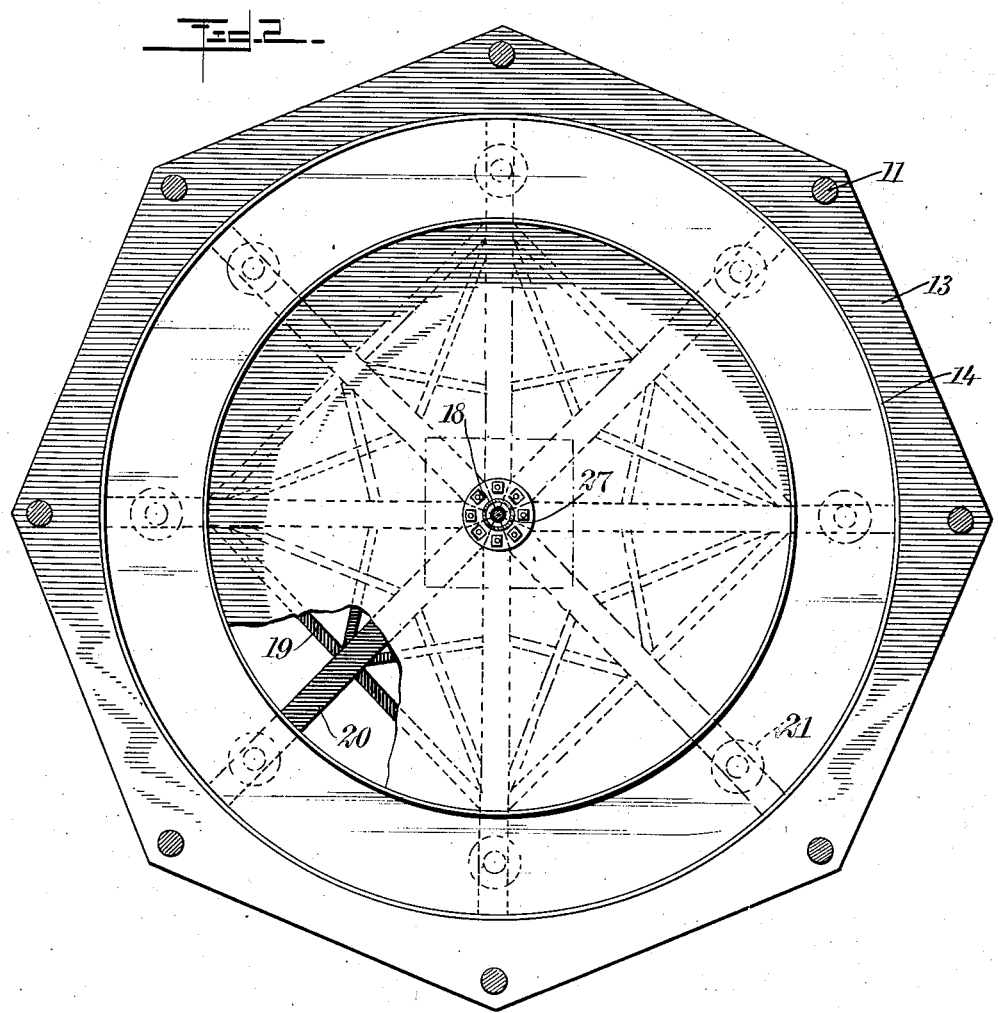
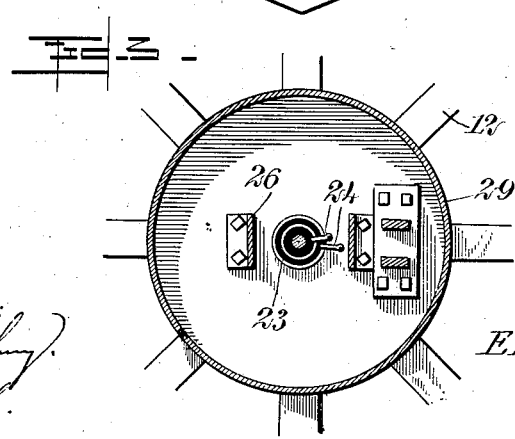
WITNESSES:
INVENTOR
Ernest T. Sulzer
BY
ATTORNEYS

UNITED STATES PATENT OFFICE.

ERNEST T. SULZER, OF NEW YORK, N. Y.

TOY FISH-TANK.

No. 819,468.　　　　Specification of Letters Patent.　　　　Patented May 1, 1906.

Application filed May 11, 1905. Serial No. 259,892.

*To all whom it may concern:*

Be it known that I, ERNEST T. SULZER, a citizen of the United States, and a resident of the city of New York, borough of Manhattan, in the county and State of New York, have invented a new and Improved Toy Fish-Tank, of which the following is a full, clear, and exact description.

My invention relates to an amusement apparatus, and in its preferred form comprises a tank for receiving water and artificial fish and means for causing the fish to move about in the tank. The fish are preferably provided with pieces of iron, so that they may be magnetized both for the purpose of catching them upon hooks formed of magnets and for the purpose of providing for their motion in the tank. I prefer to secure this motion by means of magnets located adjacent to the tank and moved in the vicinity thereof out of sight.

Reference is to be had to the accompanying drawings, forming a part of this specification, in which similar characters of reference indicate corresponding parts in all the figures.

Figure 1 is a central vertical sectional view of an apparatus constructed in accordance with the principle of my invention. Fig. 2 is a plan of the same with the top portion removed and the uprights shown in section, and Fig. 3 is a sectional view on the line 3 3 of Fig. 1.

I have illustrated a foundation 10, having uprights 11 for supporting a roof or series of covering-plates 12. Located on the foundation is a platform 13 for supporting a tank 14. This tank is preferalby annular in shape, but may be of any desired form, and it is designed to receive water and artificial fish 15. These fish are preferably provided at some point, ordinarily near the lower part of the head, with a piece of soft iron, which can be readily attracted by a magnet. This feature is not illustrated in the drawings, as it is well known in toy fishing-tanks and is usually provided for the purpose of permitting the fish to be caught on hooks. Either the hook or the iron in the body of the fish is in the form of a magnet in the usual construction; but I prefer to have the iron in the fish soft and unmagnetized.

At a point below the center of the platform is a foundation 16, having a step 17 for receiving the lower end of a vertical shaft 18. This vertical shaft is rigidly connected with a support 19, which may be solid or in the form of a skeleton frame, as indicated in Fig. 2. This platform may be provided with arms 20, and upon it are located a series of electromagnets 21. These magnets are fed by means of conductors 22, which may extend down the side of the shaft 18 from a commutator 23, located near the top of the shaft. This commutator is preferably fixed upon the shaft and rotates with it, and a pair of brushes 24 conduct current to it from binding-posts 25, mounted upon a stationary bracket 26. The shaft and wires are preferably surrounded by a tube 27, which is mounted in stationary position upon the platform, and the support 19 is preferably connected with the shaft by screws 28.

The bracket 26 may, if desired, be mounted in a casing 29 at the top of the roof 12, and in this casing is preferably located a motor 30 for turning the shaft 18. The motor is provided with a pinion 31 and the shaft with a gear 32, by means of which the necessary rotary motion is transmitted.

The operation of the device is very simple. The tank 14 being filled with water and the fish being placed in it, the motor 30 is started, carrying the magnets around in a circle and attracting the fish in the tank, so that they have the appearance of swimming around the tank, following the magnets. The magnets are of course entirely concealed, and consequently there is no visible means of moving the fish. If desired, the motor can be reversed and the fish will swim in the other direction.

It is to be understood that my invention is not limited to the use of toy fish, as birds and animals of various kinds either swimming on the surface of the water or below the surface could be operated in a similar manner.

Having thus described my invention, I claim as new and desire to secure by Letters Patent—

1. An amusement device comprising a platform adapted to support a tank for containing toy fish and the like, an attracting device for the fish located below the platform and concealed thereby, means for energizing said attracting device, a tube passing upwardly from the platform and adapted to conceal said means, and means for moving the attracting device.

2. A toy comprising a platform adapted to support a water-tank for containing images, means located below the platform for attracting said images, an electric circuit connected with said attracting means for energizing it, and means for concealing said circuit.

3. An amusement device comprising a tank for containing water, a series of images having magnetizable material connected therewith and adapted to move in the tank, a series of movable electromagnets located below the tank and concealed from view, an electric circuit connected with said magnets and passing upwardly from a point below the tank to a point above it, means for concealing said circuit, and means for connecting the circuit with a source of energy.

4. The combination with a tank for containing water and toy fish, of a movable support mounted adjacent to the tank, magnets on the support, a rod connected with said support, and conductors from the magnets to a point upon the rod whereby a current may be conducted to the magnets.

5. The combination with a tank for containing water and toy fish, of a support mounted adjacent to the tank, electromagnets on the support, a rod upon which said support is mounted, conductors passing from said magnets along the rod, means for concealing said rod and conductors, a commutator on the rod and brushes for conducting the current to said conductors, and means for moving the rod.

6. The combination with a tank for containing water and toy fish having an iron portion, of a support rotatably mounted below the tank, magnets on the support, a rod upon which said support is mounted, conductors from the magnets to a point upon the rod, a commutator on the rod in connection with said conductors, brushes bearing upon said commutator, and binding-posts connected with the brushes, whereby a current may be conducted to the magnets.

7. The combination with a tank for containing water and toy fish having an iron portion, of a support rotatably mounted below the tank, magnets on the support, a rod upon which said support is mounted, conductors from the magnets to a point upon the rod, a commutator on the rod in connection with said conductors, brushes bearing upon said commutator, binding-posts connected with the brushes, whereby a current may be conducted to the magnets, a gear-wheel upon the rod, a motor connected with said gear-wheel for rotating the rod, and means for concealing the rod.

In testimony whereof I have signed my name to this specification in the presence of two subscribing witnesses.

ERNEST T. SULZER.

Witnesses:
FRANK J. KOCH,
WM. GRAU.